US007885409B2

(12) United States Patent
Jakoubek et al.

(10) Patent No.: US 7,885,409 B2
(45) Date of Patent: Feb. 8, 2011

(54) SOFTWARE RADIO SYSTEM AND METHOD

(75) Inventors: Robert R. Jakoubek, Huntsville, AL (US); Eric O. Zuber, South Amana, IA (US); Dipak P. Patel, Cedar Rapids, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 1519 days.

(21) Appl. No.: 10/229,877

(22) Filed: Aug. 28, 2002

(65) Prior Publication Data

US 2004/0052372 A1 Mar. 18, 2004

(51) Int. Cl.
*H04K 1/00* (2006.01)

(52) U.S. Cl. .................... 380/255; 380/33; 380/277

(58) Field of Classification Search ............. 455/553.1, 455/103; 709/246; 370/467; 380/270, 33, 380/255, 277
See application file for complete search history.

(56) References Cited

U.S. PATENT DOCUMENTS

| | | | | |
|---|---|---|---|---|
| 5,020,135 | A | 5/1991 | Kasparian et al. ............. 455/76 |
| 5,197,084 | A | 3/1993 | Fuhrman ..................... 375/88 |
| 5,302,947 | A | 4/1994 | Fuller et al. ........... 340/825.34 |
| 5,404,392 | A | 4/1995 | Miller et al. .................. 379/60 |
| 5,448,765 | A | 9/1995 | Kovanen et al. .............. 455/90 |
| 5,488,356 | A | 1/1996 | Martinovich et al. ... 340/825.22 |
| 5,668,591 | A | 9/1997 | Shintani ...................... 348/12 |
| 5,801,690 | A | 9/1998 | Ayoub et al. ................ 345/329 |
| 6,034,623 | A | 3/2000 | Wandel ................. 340/870.01 |
| 6,041,035 | A * | 3/2000 | Thedens ..................... 370/217 |
| 6,052,600 | A | 4/2000 | Fette et al. .................. 455/509 |
| 6,181,734 | B1 | 1/2001 | Palermo ..................... 375/219 |
| 6,242,919 | B1 | 6/2001 | Zuk et al. ................... 324/322 |
| 6,272,457 | B1 | 8/2001 | Ford et al. ..................... 704/9 |
| 6,279,019 | B1 | 8/2001 | Oh et al. ..................... 708/300 |
| 6,279,153 | B1 | 8/2001 | Bi et al. ....................... 717/11 |
| 6,331,834 | B1 | 12/2001 | Smith ......................... 341/155 |
| 6,342,869 | B1 | 1/2002 | Edvardsson et al. ......... 343/841 |

(Continued)

FOREIGN PATENT DOCUMENTS

EP 0 510 322 10/1992

(Continued)

OTHER PUBLICATIONS

Co-pending U.S. Appl. No. 10/198,520, entitled "Modular Electronics System Package" filed Jul. 18, 2002, inventor S. Lebo.

(Continued)

*Primary Examiner*—Kimyen Vu
*Assistant Examiner*—Baotran N To
(74) *Attorney, Agent, or Firm*—Matthew J. Evans; Daniel M. Barbieri

(57) ABSTRACT

A multichannel communications device is disclosed. The multichannel communications device includes more than one transceiver. The multichannel communications device also includes a first switch configured for switching between transceivers. Further still, the multichannel communications device includes more than one cryptographic element. Yet further still, the mulitchannel communications device includes a second switch which is configured to switch between the cryptographic elements. A switch policy is configured to control communications between the cryptographic elements, including restricting communications between the cryptographic elements.

18 Claims, 1 Drawing Sheet

U.S. PATENT DOCUMENTS

| | | | |
|---|---|---|---|
| 6,353,846 B1 | 3/2002 | Fleeson | 709/104 |
| 6,452,325 B1 | 9/2002 | Dupont | 313/489 |
| 6,463,089 B1 | 10/2002 | Chauncey et al. | 375/131 |
| 6,516,204 B1 | 2/2003 | Funk et al. | 455/557 |
| 6,529,736 B1 | 3/2003 | Kopetzky | 455/456 |
| 6,549,067 B1 | 4/2003 | Kenington | 330/52 |
| 6,556,099 B2 | 4/2003 | Khan et al. | 333/34 |
| 6,591,084 B1 | 7/2003 | Chuprun et al. | 455/3.05 |
| 6,609,039 B1 | 8/2003 | Schoen | 700/94 |
| 6,614,307 B1 | 9/2003 | Zhao et al. | 330/286 |
| 6,667,708 B2 | 12/2003 | Schooler et al. | 341/173 |
| 6,671,509 B1 | 12/2003 | Tanaka et al. | 455/419 |
| 6,681,989 B2 | 1/2004 | Bodin | 235/383 |
| 6,687,901 B1 | 2/2004 | Imamatsu | 717/173 |
| 6,708,879 B2 | 3/2004 | Hunt | 235/385 |
| 6,768,435 B2 | 7/2004 | Xu | 341/143 |
| 6,785,255 B2 | 8/2004 | Sastri et al. | 370/338 |
| 6,792,273 B1 | 9/2004 | Tellinger et al. | 455/442 |
| 6,801,788 B1 | 10/2004 | Csapo et al. | 455/561 |
| 6,804,520 B1 | 10/2004 | Johansson et al. | 455/450 |
| 6,807,165 B2 | 10/2004 | Belcea | 370/347 |
| 6,823,181 B1 | 11/2004 | Kohno et al. | 455/324 |
| 6,825,766 B2 | 11/2004 | Hewitt et al. | 340/572.7 |
| 6,873,839 B2 | 3/2005 | Stanforth | 455/343.2 |
| 6,914,950 B1 | 7/2005 | Luneau | 375/347 |
| 6,944,475 B1 * | 9/2005 | Campbell | 455/553.1 |
| 2001/0037259 A1 | 11/2001 | Sharma et al. | 705/26 |
| 2002/0009161 A1 | 1/2002 | Ratni et al. | 375/316 |
| 2002/0028655 A1 | 3/2002 | Rosener et al. | 455/16 |
| 2002/0041639 A1 | 4/2002 | Krupezevic et al. | 375/324 |
| 2002/0072326 A1 | 6/2002 | Qureshey et al. | 455/3.02 |
| 2002/0082044 A1 | 6/2002 | Davenport | 455/552 |
| 2002/0098864 A1 | 7/2002 | Mukai et al. | 455/552 |
| 2002/0131480 A1 | 9/2002 | Sousa et al. | 375/147 |
| 2002/0137514 A1 | 9/2002 | Mitsugi et al. | 455/436 |
| 2002/0144134 A1 | 10/2002 | Watanabe et al. | 713/191 |
| 2002/0151298 A1 | 10/2002 | Muhonen | 455/418 |
| 2002/0160765 A1 | 10/2002 | Okajima | 455/419 |
| 2003/0023761 A1 | 1/2003 | Jeansonne et al. | 709/250 |
| 2003/0026200 A1 | 2/2003 | Fu et al. | 370/208 |
| 2003/0028787 A1 | 2/2003 | Fayed et al. | 713/189 |
| 2003/0039214 A1 | 2/2003 | Huffman | 370/252 |
| 2003/0040282 A1 | 2/2003 | Park | 455/67.1 |
| 2003/0048762 A1 | 3/2003 | Wu et al. | 370/328 |
| 2003/0050055 A1 | 3/2003 | Ting et al. | 455/419 |
| 2003/0050073 A1 | 3/2003 | Wasko | 455/452 |
| 2003/0067902 A1 | 4/2003 | Skeba | 370/328 |
| 2003/0074473 A1 * | 4/2003 | Pham et al. | 709/246 |
| 2003/0079048 A1 | 4/2003 | Kim | 709/318 |
| 2003/0081580 A1 | 5/2003 | Vaidyanathan et al. | 370/338 |
| 2003/0083055 A1 | 5/2003 | Riordan et al. | 455/419 |
| 2003/0143988 A1 | 7/2003 | Jamadagni | 455/418 |
| 2003/0158954 A1 | 8/2003 | Williams | 709/230 |
| 2003/0163551 A1 | 8/2003 | Riodan | 709/219 |
| 2003/0174731 A1 | 9/2003 | Tafazolli et al. | 370/469 |
| 2003/0216927 A1 | 11/2003 | Sridhar et al. | 705/1 |
| 2004/0005910 A1 | 1/2004 | Tom | 455/558 |
| 2004/0022332 A1 | 2/2004 | Gupta et al. | 375/343 |
| 2004/0029545 A1 | 2/2004 | Anderson et al. | 455/151.2 |
| 2004/0048608 A1 | 3/2004 | Matwuo et al. | 455/418 |
| 2004/0052372 A1 | 3/2004 | Jakoubek | 380/255 |
| 2004/0063425 A1 | 4/2004 | Wakutsu et al. | 455/418 |
| 2004/0087283 A1 * | 5/2004 | Jones et al. | 455/103 |
| 2004/0105533 A1 | 6/2004 | Iseli | 379/106.01 |
| 2004/0127202 A1 | 7/2004 | Shih et al. | 455/418 |
| 2004/0128133 A1 | 7/2004 | Sacks et al. | 704/270 |
| 2004/0128134 A1 | 7/2004 | Sacks et al. | 704/270 |
| 2004/0128200 A1 | 7/2004 | Sacks et al. | 705/16 |
| 2004/0132500 A1 | 7/2004 | Rogalski et al. | 455/569.1 |
| 2004/0133303 A1 | 7/2004 | Sacks et al. | 700/213 |
| 2004/0136452 A1 | 7/2004 | Feldman et al. | 375/227 |
| 2004/0138781 A1 | 7/2004 | Sacks et al. | 700/245 |
| 2004/0143652 A1 | 7/2004 | Grannan et al. | 709/223 |
| 2004/0153957 A1 | 8/2004 | Feldman et al. | 714/795 |
| 2004/0161062 A1 | 8/2004 | Richey et al. | 375/344 |
| 2004/0185805 A1 | 9/2004 | Kim et al. | 455/114.3 |
| 2004/0203709 A1 | 10/2004 | Luneau | 455/422.1 |
| 2004/0203733 A1 | 10/2004 | Collum et al. | 455/426.1 |
| 2004/0203837 A1 | 10/2004 | Lawrence | 455/455 |
| 2004/0215753 A1 | 10/2004 | Chan et al. | 709/223 |
| 2004/0224647 A1 | 11/2004 | Ma et al. | 455/90.3 |
| 2004/0242236 A1 | 12/2004 | Inagaki | 455/452.2 |
| 2004/0242261 A1 | 12/2004 | Fette | 455/550.1 |
| 2005/0007988 A1 | 1/2005 | Ferris et al. | 370/349 |
| 2005/0008098 A1 | 1/2005 | Iancu et al. | 375/316 |
| 2005/0024927 A1 | 2/2005 | Dolwin | 365/154 |
| 2005/0025170 A1 | 2/2005 | Po et al. | 370/431 |
| 2005/0027789 A1 | 2/2005 | Luo et al. | 709/200 |
| 2005/0032480 A1 | 2/2005 | Lee et al. | 455/76 |
| 2005/0041746 A1 | 2/2005 | Rosen et al. | 375/242 |
| 2005/0055689 A1 | 3/2005 | Abfalter et al. | 717/174 |
| 2005/0057578 A1 | 3/2005 | Chen et al. | 345/630 |
| 2005/0059427 A1 | 3/2005 | Wallace | 455/552.1 |
| 2005/0079890 A1 | 4/2005 | Yu | 455/557 |
| 2005/0108382 A1 | 5/2005 | Murotake et al. | 709/223 |
| 2005/0124330 A1 | 6/2005 | Hong et al. | 455/418 |
| 2005/0130653 A1 | 6/2005 | Biskikian et al. | 455/432.3 |
| 2005/0143005 A1 | 6/2005 | Moore, III | 455/13.1 |
| 2005/0157677 A1 | 7/2005 | Dowling | 370/328 |
| 2005/0160124 A1 | 7/2005 | Bisiaux | 708/300 |
| 2005/0190791 A1 * | 9/2005 | Elliott | 370/467 |

FOREIGN PATENT DOCUMENTS

| | | |
|---|---|---|
| EP | 0 586 635 | 3/1994 |
| EP | 0 675 661 | 10/1995 |
| EP | 0 684 743 | 11/1995 |
| EP | 0 785 694 | 7/1997 |
| EP | 0 943 928 | 9/1999 |
| EP | 1 201 039 | 5/2001 |
| EP | 1 1454 50 | 10/2001 |
| EP | 1 218 858 | 7/2002 |
| EP | 1 225 775 | 7/2002 |
| EP | 1 263 249 | 12/2002 |
| EP | 1 283 994 | 2/2003 |
| EP | 1 415 490 | 2/2003 |
| EP | 1 302 088 | 4/2003 |
| EP | 1 335 289 | 8/2003 |
| EP | 1 352 788 | 10/2003 |
| EP | 1 401 224 | 3/2004 |
| EP | 1 437 667 | 7/2004 |
| EP | 1 528 723 | 5/2005 |
| EP | 1 557 743 | 7/2005 |
| JP | 6-25291 | 9/1994 |
| JP | 8-79379 | 3/1996 |
| JP | 9-224271 | 8/1997 |
| JP | 10-075206 | 3/1998 |
| JP | 11-055178 | 2/1999 |
| JP | 11-088508 | 3/1999 |
| JP | 11-220422 | 8/1999 |
| JP | 11-275171 | 10/1999 |
| JP | 11-341539 | 12/1999 |
| JP | 11-346186 | 12/1999 |
| JP | 2000-032154 | 1/2000 |
| JP | 2000-236268 | 8/2000 |
| JP | 2000-308135 | 11/2000 |
| JP | 2000-324043 | 11/2000 |
| JP | 2001-016355 | 1/2001 |
| JP | 2001-043087 | 2/2001 |
| JP | 2001-044882 | 2/2001 |
| JP | 2001-045566 | 2/2001 |
| JP | 2001-045567 | 2/2001 |
| JP | 2001-061186 | 3/2001 |
| JP | 2001-075717 | 3/2001 |

| | | |
|---|---|---|
| JP | 2001-094445 | 4/2001 |
| JP | 2001-101005 | 4/2001 |
| JP | 2001-189700 | 7/2001 |
| JP | 2001-256052 | 9/2001 |
| JP | 2001-285175 | 10/2001 |
| JP | 2001-285179 | 10/2001 |
| JP | 2001-308730 | 11/2001 |
| JP | 2001-356979 | 12/2001 |
| JP | 2002-064399 | 2/2002 |
| JP | 2002-064451 | 2/2002 |
| JP | 2002-076979 | 3/2002 |
| JP | 2002-132400 | 5/2002 |
| JP | 2002-135276 | 5/2002 |
| JP | 2002-141823 | 5/2002 |
| JP | 2002-204273 | 7/2002 |
| JP | 2002-261723 | 9/2002 |
| JP | 2002-269473 | 9/2002 |
| JP | 2002-300071 | 10/2002 |
| JP | 2002-300664 | 10/2002 |
| JP | 2002-368543 | 12/2002 |
| JP | 2003-044301 | 2/2003 |
| JP | 2003-078475 | 3/2003 |
| JP | 2003-101474 | 4/2003 |
| JP | 2003-116040 | 4/2003 |
| JP | 2003-174404 | 6/2003 |
| JP | 2003-198450 | 7/2003 |
| JP | 2003-218731 | 7/2003 |
| JP | 2003-219464 | 7/2003 |
| JP | 2003-304235 | 10/2003 |
| JP | 2003-318802 | 11/2003 |
| JP | 2003-333663 | 11/2003 |
| JP | 2003-338799 | 11/2003 |
| JP | 2004-023753 | 1/2004 |
| JP | 2004-120650 | 4/2004 |
| JP | 2004-135221 | 4/2004 |
| JP | 2004-153659 | 5/2004 |
| JP | 2004-153661 | 5/2004 |
| JP | 2004-153662 | 5/2004 |
| JP | 2004-153663 | 5/2004 |
| JP | 2004-201024 | 7/2004 |
| JP | 2004-213339 | 7/2004 |
| JP | 2004-240869 | 8/2004 |
| JP | 2004-253993 | 9/2004 |
| JP | 2004-260513 | 9/2004 |
| JP | 2004-272789 | 9/2004 |
| JP | 2004-274300 | 9/2004 |
| JP | 2004-297357 | 10/2004 |
| JP | 2004-326689 | 11/2004 |
| JP | 2004-334735 | 11/2004 |
| JP | 2004-334736 | 11/2004 |
| JP | 2004-343500 | 12/2004 |
| JP | 2005-039557 | 2/2005 |
| WO | WO 97/08838 | 3/1997 |
| WO | WO 97/15161 | 4/1997 |
| WO | WO 00/41407 | 7/2000 |
| WO | WO 00/74412 | 12/2000 |
| WO | WO 01/17123 | 3/2001 |
| WO | WO 01/31939 | 5/2001 |
| WO | WO 01/72058 | 9/2001 |
| WO | WO 02/15419 | 2/2002 |
| WO | WO 02/01740 | 3/2002 |
| WO | WO 02/30141 | 4/2002 |
| WO | WO 02/059752 | 8/2002 |
| WO | WO 02/091694 | 11/2002 |
| WO | WO 2004/008719 | 1/2004 |
| WO | WO 2004/064271 | 7/2004 |
| WO | WO 2004/074975 | 9/2004 |
| WO | WO 2005/004513 | 1/2005 |
| WO | WO 2005/011185 | 2/2005 |
| WO | WO 2005/013540 | 2/2005 |
| WO | WO 2005/029808 | 3/2005 |
| WO | WO2005/032099 | 4/2005 |
| WO | WO 2005/043930 | 5/2005 |
| WO | WO 2005/062642 | 7/2005 |
| WO | WO 2005/065098 | 7/2005 |

OTHER PUBLICATIONS

Co-pending U.S. Appl. No. 10/198,493, entitled "Modular Electronics System Chassis" filed Jul. 18, 2002, inventor S. Lebo.
Co-pending U.S. Appl. No. 10/198,361, entitled "Ruggedized Electronics Sub-System Module" filed Jul. 18, 2002, inventor S. Lebo.
Co-pending U.S. Appl. No. 10/197,737, entitled "Ruggedized Electronic Module Cooling System" filed Jul. 18, 2002, inventor S. Leo and S. Sellner.
Co-pending U.S. Appl. No. 10/198,473, entitled "Electronic Module Restraint Apparatus" filed Jul. 18, 2002, inventor S. Lebo and Sellner.
Co-pending U.S. Appl. No. 10/198,522, entitled "Restraint Apparatus For An Electronics Module" filed Jul. 18, 2002, inventor S. Lebo.
Co-pending U.S. Appl. No. 10/229,941, entitled "Modular Communication Platform" filed Aug. 22, 2002, inventor S. Lebo.
"SINCGARS, Evolution to Resolution", ITT Industries (www.acd.itt.com), Nov. 20, 2002.
"Programmable Cryptography Emerges From Advanced Chip", Signal Magazine, Aug. 1998, pp. 1-6.

* cited by examiner

SOFTWARE RADIO SYSTEM AND METHOD

REFERENCE TO RELATED PATENT APPLICATIONS

This application relates to the following group of applications:

U.S. patent application Ser. No. 10/198,520, entitled "MODULAR ELECTRONICS SYSTEM PACKAGE", and having inventor Steve I. Lebo;

U.S. patent application Ser. No. 10/198,493, entitled "MODULAR ELECTRONICS SYSTEM CHASSIS", and having inventor Steve I. Lebo;

U.S. patent application Ser. No. 10/198,361, entitled "RUGGEDIZED ELECTRONICS SUB-SYSTEM MODULE", and having inventor Steve I. Lebo;

U.S. patent application Ser. No. 10/197,737, entitled "RUGGEDIZED ELECTRONIC MODULE COOLING SYSTEM", and having inventors Steve I. Lebo and Scott J. Sellner;

U.S. patent application Ser. No. 10/198,473, entitled "ELECTRONIC MODULE RESTRAINT APPARATUS", and having inventors Steve I. Lebo and Scott J. Sellner;

U.S. patent application Ser. No. 10/198,522, entitled "RESTRAINT APPARATUS FOR AN ELECTRONICS MODULE", and having inventor Steve I. Lebo; and U.S. patent application Ser. No. 10/229,941 entitled "MODULAR COMMUNICATION PLATFORM", and having inventors Richard D. Spring, Timothy E. Snodgrass, Robert R. Jakoubek and Steve I. Lebo, which is filed on the same day herewith.

The foregoing application are all herein incorporated by Reference in their entirety.

BACKGROUND

The disclosure relates generally to the field of multichannel radio systems. Further, the disclosure relates to modular multichannel radio systems that may be used in military applications. Further still, the disclosure relates to a multichannel software radio system in which switch bus architecture is used for improved security and fault tolerance.

In conventional multichannel radio systems, back plane buses are used to communicate between processors on the black side, that is, the side on which any classified information has been encrypted, and the processors on the red side, that is, processors which are handling information that is classified, but has not yet been encrypted. In conventional systems, the red side processors are coupled to a red back plane bus and the black side processors are coupled to a black back plane bus which means that each processor has access to the next and every other processor on its side. Further, all of the processors on the red side may easily access the cryptography that is used to encrypt the traffic for further processing by the black side. Accordingly, conventional systems do not provide substantial isolation among processors on each side, and further, because of the lack of isolation, conventional systems do not provide desired fault tolerance in that if processing for a single waveform on a specific processor should fail, it may be possible that the processor will cause the failure of all of the processors on that bus to fail. Furthermore, in conventional multichannel radio systems, the lack of isolation between red side processors prevents the processing of information that must remain separate for reasons of security.

Accordingly, there is a need for a software radio architecture which includes black side and red side switching and which provides isolation between processors and between channels.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the above-mentioned needs.

SUMMARY

An example of the invention relates to a multichannel communications device. The multichannel communications device includes more than one transceiver and a first switch configured for switching between transceivers. The multichannel communications device also includes more than one cryptographic element and a second switch configured to switch between the cryptographic elements. Further, the multichannel communications device includes a switch policy configured to control communications between the cryptographic elements, including restricting communications between the cryptographic elements.

Another example of the invention relates to a method of sending data using a communications device. The method includes accessing a switch policy. The method also includes selecting a cryptographic element from more than one cryptographic element, based on the switch policy. Further, the method includes encrypting the data, selecting a transceiver, and switching to the selected transceiver.

Yet another example of the invention relates to a modular radio system. The modular radio system includes more than one transceiver. Each transceiver may be in an individual module. The modular radio system also includes a first switch configured for switching between transceivers. The modular radio system further includes more than one cryptographic element and a second switch configured to switch between the cryptographic elements. Further still, the modular radio system includes a switch policy configured to control communications between the cryptographic elements, including restricting communications between the cryptographic elements. The first switch, the cryptographic elements, the second switch, and the switch policy may be incorporated into another individual module.

Alternative exemplary embodiments relate to other features and combination of features as may be generally recited in the claims.

BRIEF DESCRIPTION OF THE DRAWINGS

The invention will become more fully understood from the following detailed description, taken in conjunction with the accompanying drawing, wherein like reference numerals refer to like elements, in which.

DETAILED DESCRIPTION OF PREFERRED AND EXEMPLARY EMBODIMENTS

Figure 1:
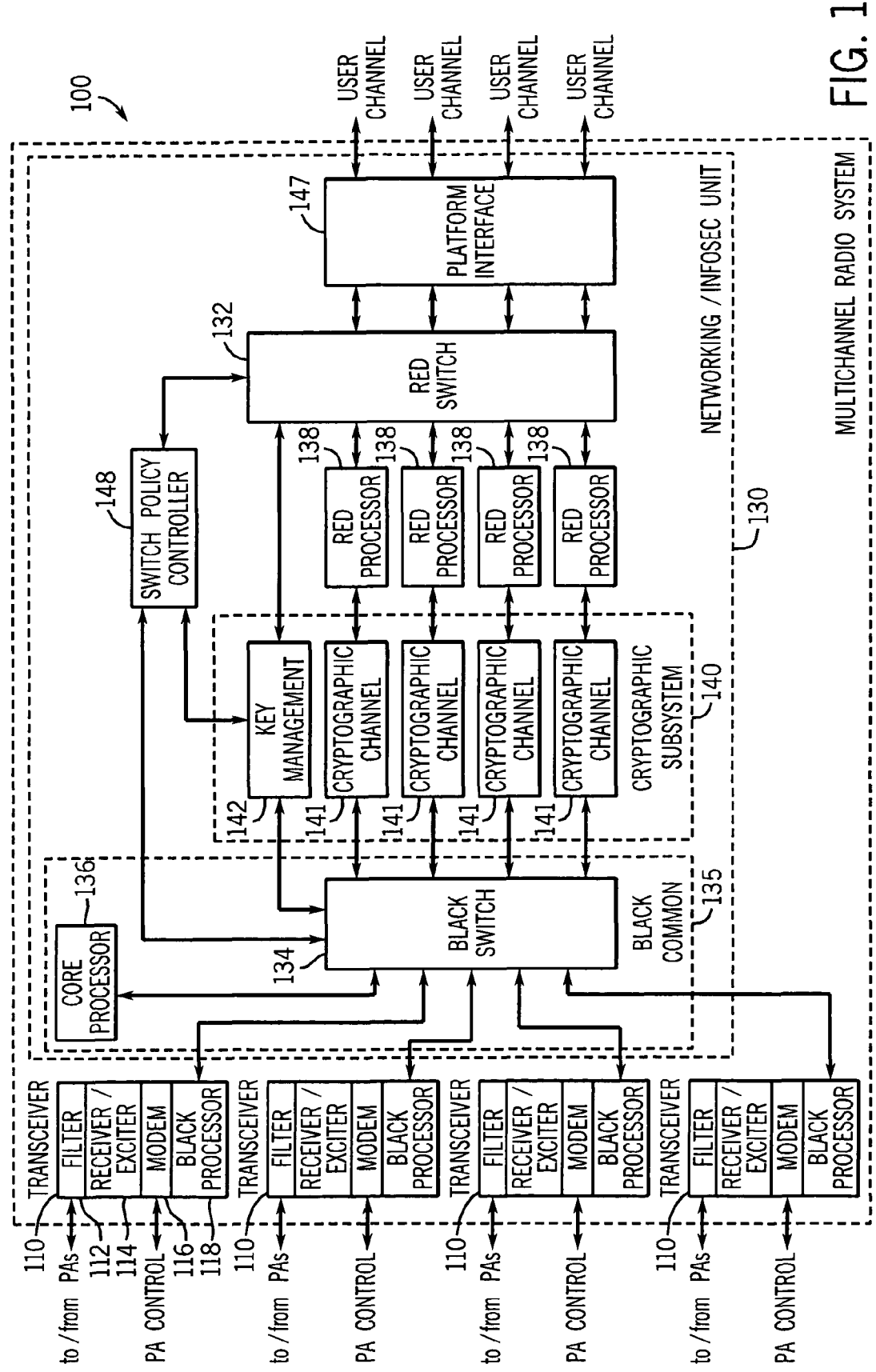
FIG. 1 is an exemplary block diagram of a modular radio system.

Referring to FIG. 1, an exemplary block diagram representing a multichannel radio system 100 is depicted. This exemplary embodiment provides four radio channels. Alternative embodiments may support greater or fewer channels. In this exemplary embodiment, transceivers 110 are depicted, each containing a filter 112, a receiver/exciter (R/E) 114, a modem 116, and a black processor 118. Transceiver 110 may provide either full or half duplex capabilities. Transceiver 110 may provide capabilities across the entire spectrum for which multichannel radio system 100 is designed, or may be special purpose devices providing capabilities for only a portion of the spectrum. Transceiver 110 may or may not also contain power amplification. Further transceivers 110 are coupled to power amplifiers (not depicted) and other radio frequency (RF) devices such as antenna switching and cosite mitigation to the left of the transceivers 110. Transceivers 110 are also coupled on the right to a Networking/Information Security (INFOSEC) functional unit (NIU) 130 consisting of cryptographic devices 141 and red processors 138. Red processors 138 are furthermore coupled to their right to platform interface 147. Platform interface 147 may be unique for each platform on which multichannel radio system 100 is installed.

NIU 130 supports red applications, INFOSEC functions, and platform interfaces in the exemplary block diagram. NIU 130 also contains red switch 132 and black switch 134. Primary functional components of NIU 130 include: general purpose processing using core processor 136, red processing using any of the selected red processors 138, cryptography in the cryptographic element 140 using a cryptographic channel 141 corresponding to the selected processors 138, key manager 142, black switching using black switch 134., red switching using red switch 132 and red platform specific interface 147.

Core processor 136 hosts a plurality of functions that configure and control the remainder of the multichannel modular radio system 100. Core processor 136 provides control to the black common 135 of NIU 130. Core processor 136 provides control to the red processors 138 via key manager 142. Core processor 136 loads application software onto black processors 110 and, via the bypass function for cryptographic channel 141, loads application software to red processors 138. Core processor 136 requests configuration of red switch 132 via switch policy 148. Overall, core processor 136 controls the flow of radio traffic from platform interface 147, through red processor 138 and the corresponding cryptographic channel 141, to black processor 110.

Each red processor 138 is dedicated to a single communications channel. Red processor 138 performs all red applications associated with its single communication channel as well as other applications permitted by the security policy for the multichannel modular radio system 100. Having multiple separate red processors 138 eliminates the need for a high assurance software operating environment to separates applications one from the others based on the security policy for the multichannel modular radio system 100. Also, multiple separate red processors 138 permit multiple independent levels of security, one given level on each individual red processor 138. When in the future a high assurance operating environment becomes available, it may be used on the red processors 138 to achieve multiple levels of security, with multiple levels on any single red processor 138.

Cryptographic element 140 provides independent encryption/decryption paths for red processors 138. This provides multiple independent levels of security through cryptographic element 140.

Each cryptographic channel 141 interfaces with black switch 134 in the black common functional area 138 of NIU 130. In an exemplary embodiment, the interface may be any high speed serial interface such as TIA/EIA-644 Low Voltage Differential Signaling. An alternative exemplary embodiment may use a parallel interface. On the red side, each cryptographic channel 141 connects directly to one red processor 138. In an alternative exemplary embodiment, each cryptographic channel 141 could connect to red switch 132 to provide connectivity around failed cryptographic channel 141 or red processor 138 elements or their interfaces. Cryptographic channels 141 also interface with key manager 142 for loading of cryptographic keys and algorithms.

Red switch 132 and black switch 134 provide connectivity for applications as they are instantiated. The connectivity may be end to end from platform interface 147 to transceiver 120, or may connect one red processor 138 to another red processor 138 and from one black processor 110 to another black processor 110 to provide respectively red and black retransmission, relay or networking functionality between two applications. Red switch 132 is a high assurance switch certified for multiple independent levels of security, under which any red processor 138 is only permitted to connect to other red processors 138 at the same security level and with permission to exchange information. In this exemplary embodiment, the connections to both red switch 132 and black switch 134 may be any high speed serial interface. An alternative exemplary embodiment may use a parallel interface.

Red switch 132 provides data isolation between red processors 138 as well as platform interface 147 to allow the connections between any specific interface in platform interface 147 and any specific red processor 138, and between any two or more red processors 138 for purposes of retransmission, relay and networking.

Key to the red switching is switch policy 148. Red switch 132 is controlled by switch policy 148. Switch policy 148 receives request for red switch 132 configurations from core processor 136, receives security policy information from key manager 142, and then determines whether the request configuration is acceptable within the security policy. If the configuration of red switch 132 is acceptable within the security policy, then switch policy 148 directs the configuration of red switch 132 as requested by core processor 136. If the configuration of red switch 132 is acceptable within the security policy, then switch policy 148 raises a security alarm.

While the detailed drawings, specific examples and particular formulations given describe preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the computing devices. For example, the type of computing device, communications bus, or processor used may differ. The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A multichannel communications device, comprising:
a plurality of transceivers for communication of encrypted signals;
a first switch configured for switching between the transceivers;
a cryptographic subsystem including a key manager and a plurality of cryptographic channels, each channel being coupled to the first switch, the first switch being between the channels and the transceivers, wherein each cryptographic channel is configured to send and receive the encrypted signal to and from the first switch;

a plurality of red processors for communicating non-encrypted signals; a second switch configured to send and receive the non-encrypted signals to and from the cryptographic channels, the second switch disposed between the red processors and a platform interface; and a switch policy configured to control communications between the red processors, wherein the switch policy receives security information from the key manager for determining acceptable configurations, wherein the key manager is coupled directly to the first switch and the second switch, wherein the multichannel communications device is made up of modular components, each module having an individual housing, wherein the first switch, the second switch and the cryptographic subsystem are disposed in a single module.

2. The multichannel communications device of claim 1, wherein
the key manager includes cryptographic keys for the cryptographic channels.

3. The multichannel communications device of claim 1, wherein each of the red processors correspond to a respective channel of the cryptographic channels.

4. The multichannel communications device of claim 1, wherein each transceiver is configured for transmitting data on a different channel.

5. A method of sending data using a communications device, the method comprising:
accessing a switch policy;
selecting a cryptographic channel from a plurality of cryptographic channels coupled to a plurality of red processors, under control of the switch policy, wherein the more than one of the cryptographic processors are coupled to, and selectable from, a first switch through the red processors, wherein the cryptographic channels are part of a cryptographic subsystem including a key manager;
encrypting the data;
sending the encrypted data to a second switch, wherein the cryptographic channels are between the red processors and the second switch, wherein the second switch is between a plurality of transceivers and the cryptographic channels; and
selecting a transceiver from the plurality of transceivers, wherein the plurality of transceivers are selectable from the second switch, wherein the switch policy receives security information from the key manager for determining acceptable configurations, wherein the key manager is coupled directly to the first switch and the second switch,
wherein a multichannel communications device is made up of modular components, each module having an individual housing, wherein the first switch, the second switch and the cryptographic subsystem are disposed in a single module.

6. The method of claim 5,
wherein the switch policy is directly coupled to the first and second switch and directly coupled to the key manager.

7. The method of claim 5, wherein the red processors are each associated with a single cryptographic channel.

8. The method of claim 5, further comprising:
processing the encrypted data on a black processor in the transceiver.

9. The method of claim 5, further comprising:
transmitting the encrypted data.

10. The method of claim 5, further comprising:
accessing, a second time, the switch policy.

11. The method of claim 10, wherein the selecting a transceiver step is based on the switch policy upon the second time.

12. A modular radio system, comprising:
more than one transceiver, each transceiver being in an individual module and including a black processor for processing an encrypted signal;
a first switch configured for switching between transceivers and cryptographic channels in a cryptographic subsystem including a key manager;
wherein each of the cryptographic channels is configured to send and receive the encrypted signal to and from the first switch;
a second switch configured to switch between a plurality of red processors coupled to the cryptographic channels and a platform interface, wherein the second switch is configured to send and receive a non-encrypted signal to and from the red processors; and
a switch policy configured to control communications between the cryptographic channels, including restricting communications between the cryptographic channels,
wherein the first switch policy receives security information from the key manager for determining acceptable configurations, wherein the key manager is coupled directly to the first switch and the second switch,
wherein the modular radio system is made up of modular components, each module having an individual housing, wherein the cryptographic subsystem, the first switch and the second switch are disposed in a single module.

13. The modular radio system of claim 12, wherein:
the key manager provides cryptographic keys for the cryptographic channels.

14. The modular radio system of claim 12, wherein the red processors are directly coupled to the cryptographic channels.

15. The modular radio system of claim 12, wherein each transceiver includes a black processor and is configured for transmitting data on a different channel.

16. The modular radio system of claim 12, wherein each module is environmentally sealed.

17. The multichannel communications device of claim 12, further comprising:
a core processor coupled to the first switch and configured to provide control to the black and red processors.

18. The modular radio system of claim 17, wherein:
each of the red processors are directly coupled to a dedicated, respective cryptographic channel of the cryptographic channels.

* * * * *